United States Patent Office 3,477,400
Patented Nov. 11, 1969

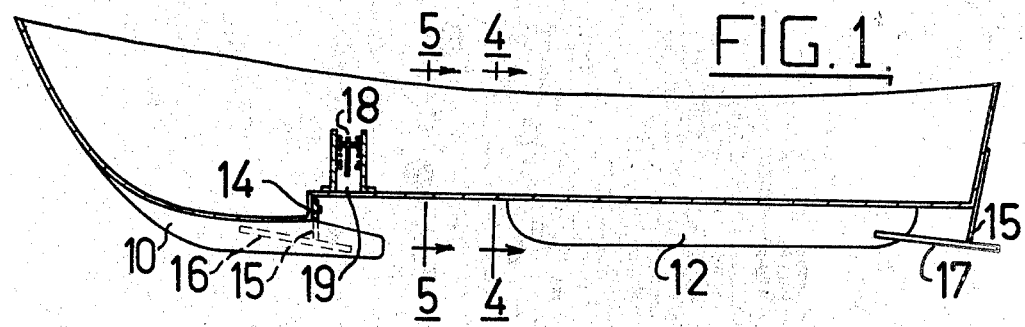
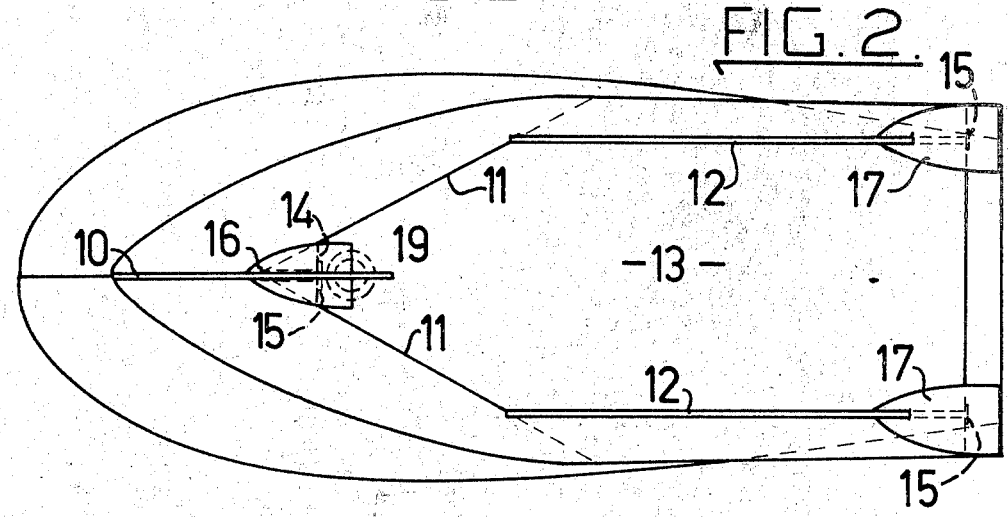
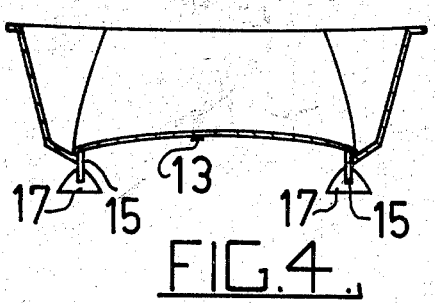
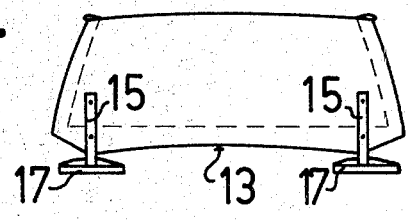
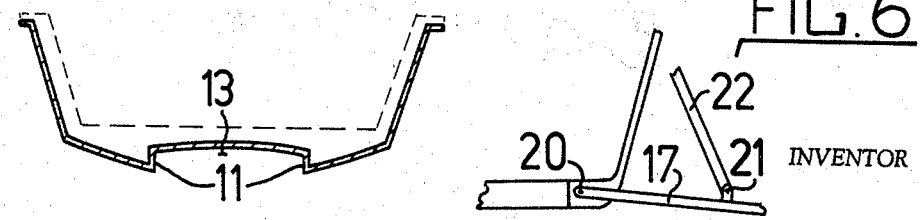

3,477,400
HYDROFOIL CRAFT
Hamilton Walker, 24 Kiripaka Road, Whangarei,
Auckland, New Zealand
Filed Dec. 14, 1967, Ser. No. 690,453
Claims priority, application New Zealand, Dec. 20, 1966,
147,403
Int. Cl. B63b 1/20, 1/38
U.S. Cl. 114—66.5    18 Claims

ABSTRACT OF THE DISCLOSURE

An improved hydrofoil craft having three foils, one a central leading foil, and the other two foils being respectively at each side towards the rear of the craft and a divided keel structure, with one hull part extending between the leading foil and the respective side foils providing a tunnel, for which the leading foil acts as a wave breaker, the side foils serve to give stability to the hull, and the tunnel acting as an airfoil.

---

This invention relates to hydrofoil craft designed to travel on water.

A hydrofoil craft has the advantage over conventional craft of greatly increased speed with a given horse-power, resulting in greater economy in fuel per mile. Another advantage is its freedom from pounding on the water, during rough weather.

However, present types of such craft have various foil arrangements such as those with foils located at the end of struts descending from the hull; these have the disadvantages that on hitting any solid object at speed they damage the foils, the struts, and even the mountings at the hull. Again the foils and struts can be fouled with seaweed and other floating rubble. In craft where the foils are fitted to the sides of the hull or added to the beam by extending beyond the gunwales, they impart a heavy stress on that area which could effect structural damage to the craft as well as making the craft harder to berth. There are also boats that have foils designed to lift the boat well clear of the water to stop hull pounding. Generally in this type of boat the foils have to be raised when the boat slows or the hull has a deep draught. Again there are craft that have foils without close access to an air-feed so as to keep down the suction on the foils at all speeds. Generally in cases where the foils are adjustable or mounted on struts, there is a larger number of supplementary working parts thus adding to cost and time, such as in service maintenance etc.

The object of the present invention is to provide an improved hydrofoil craft having such a construction and/or arrangement of its parts that to a large extent the aforesaid disadvantages are overcome.

Broadly the invention consists of an improved hydrofoil craft having three foils, one, a central leading foil, and the other two foils being respectively at each side towards the rear of the craft and a divided keel structure, with one hull part extending between the leading foil and the respective side foils providing a tunnel, for which the leading foil acts as a wave breaker, the side foils serve to give stability to the hull, and the tunnel acting as an airfoil.

The craft further includes an automatically controlled air valve designed and positioned to admit air to the tunnel, when there is suction and to stop the air when it starts to compress.

In further describing the invention, reference will be made hereinafter to the diagrammatic drawing, in which:
FIGURE 1 is a central longitudinal sectional view,
FIGURE 2 is an inverted plan view,
FIGURE 3 is a rear view of the craft's hull,
FIGURE 4 is a cross-section taken on the line 4—4 of FIGURE 1,
FIGURE 5 is a cross-section taken on the line 5—5 of FIGURE 1, and
FIGURE 6 is detail view of a variable pitch rear foil later referred to.

In giving effect to the invention, the hull design includes the divided heel structure including a twin keel arrangement. This can be part of a stepped hull design.

In a preferred embodiment the front keel part or section 10 is located on the longitudinal centre-line of the hull with diagonal steps 11 thereof tapering back and outward to suit the underside curves of the hull. These steps 11 continue inside the hull, both forward and backward, so that they give increased strength and bracing to the hull. At a predetermined position the twin keels 12 begin and run back in parallel alignment providing the main portion of the tunnel 13 between them.

The keel depth is such as to allow the hull to have a very shallow draught whilst the step at the front of the tunnel gives a vertical surface 14 on to which a bracket 15 for the front foil 16 is bolted.

The start and finish of each keel is given a gradual curve and the tunnel 13 in cross-section is generally concave and at the rear the keels 12 help to give two V-sections to the hull cross-section. At the front, the tunnel 13 is deeper than at the rear.

As previously indicated there are the three foils, the leading centre foil 16 and the two side rear foils 17; they are so positioned that the boat's normal draught is not affected when the boat is stopped as they do not add to the draught. The leading foil 16 is higher than the bottom of the front keel section 10 and is inset; the rear foils 17 are located behind the rear end of the respective keels 12.

Preferably the leading end of each foil is held in place by a keel bolt (not shown) whilst its rear end is attached to single flat steel bracket 15 in a sheltered position of the respective keels. The foils are thus mounted so as to provide lift directly on to the keels and each foil thus has its side stress plus that of the keel provided for by the sheltered bracket on to the step or the transom.

The air valve 18 is one of a large-diameter bore so as to allow a large volume of down draught air. This valve is located so that its bottom outlet 19 is positioned on the craft's centre line and over the rear end of the leading foil 16 so as to provide air-flow to the upper surface of such foil and provide an air cushion in the tunnel 13.

A further feature of the invention is the provision for varying the pitch of the rear foils 17. This is accomplished by these foils each having a pivot pin coupling 20 at its leading end and a pivot pin coupling 21 for a control rod 22 at its rear upper surface as shown in FIGURE 6. These rods 22 are designed to allow the pitch of the foils 17 to be altered in 1° steps from 0° to 7°, preferably done through a mechanical means or a hydraulic means (not shown).

In general application, as previously stated, the three foils 16, 17 afford proper stability to the craft, giving virtually a three-point suspension, the leading foil 16 being the apex to the front where the load is the lightest and as well this foil acts as a wave breaker in rough conditions. The two rear foils 17 are thus positioned where the load is heaviest and being right out at the sides of the hull give inherent stability thereto.

More specifically the foils being mounted in or on the keels and of such shape, they will not be damaged when hitting a floating object. Their lift is directly on the keels and they do not add to the beam of the hull, and not having struts are not fouled by weed.

The foils have only to lift the hull slightly as the hull is air-cushioned. The closeness of the foils to the air will stop any suction being created.

The hull being very shallow draught it is not necessary to lower the propeller to any degree. When the craft is planing on the foils, the full area of its tunnel 13 is turned into an air foil that assists the hydrofoils. The diagonal steps 11 of the tunnel 13 will at lower speeds and in rough water give a spin to the turbulent water which they create. The steps also help to give a good distribution of the air from the air valve 18 to mix into the turbulent water at slow speeds of the craft.

The concave cross-section of the tunnel 13 affords an arch construction between the keels 12 to maintain full hull strength, and with the main lift, being off, or in close proximity to the keels, the hull gives better internal support for a load. This tunnel design, further, being deeper at the front gives it a pitch for the air-foil lift at high speeds of the craft, as well as providing depth of air in rough water for the air-cushioning at the critical "spank area."

The air valve 18 featuring at low speeds gives air flow to the upper surface of the front foil 16 as well as to the lee of the steps 11 so there is no suction there. This air flow joins with the turbulent water coming over the steps. At high speed when the hull is feeding into, or down onto a wave, the valve 18 closes so that the air is compressed thereby creating the air-cushion for the craft to ride on, so as to stop any thump or spank. The hull with its keels and foils are of such a design that it is easy to load and unload for conveyance.

Where the hull has considerable length, supplementary foils (not shown) can be provided at or near the front of the rear keels, so as to give better distribution of the hull weight on to all foils with increased stability.

What is claimed is:

1. An improved hydrofoil craft having three foils, one, a central leading foil, and the other two foils being respectively at each side towards the rear of the craft and a divided keel structure, with one hull part extending between the leading foil and the respective side foils providing a tunnel, for which the leading foil acts as a wave breaker, the side foils serve to give stability to the hull, and the tunnel acting as an air foil, and an automatically controlled air valve designed and positioned to admit air to the tunnel when there is suction and to stop the air when it starts to compress.

2. An improved hydrofil craft as claimed in claim 1 wherein a hydraulic means is incorporated for effecting pitch variation.

3. An improved hydrofoil craft as claimed in claim 1 wherein the hull includes a twin keel arrangement.

4. An improved hydrofoil craft as claimed in claim 3 and wherein the twin keel arrangement is part of a stepped hull.

5. An improved hydrofoil craft as claimed in claim 1 and wherein a front section of the keel is located on the longitudinal centre-line of the hull with diagonal steps of the hull tapering back and outward to suit underside curves of the hull.

6. An improved hydrofoil craft as claimed in claim 5 and wherein the diagonal steps continue inside the hull, both forward and backward, so that they give increased strength and bracing to the hull.

7. An improved hydrofoil craft as claimed in claim 3 and wherein at a predetermined position the twin keels begin and run back in parallel alignment providing the main portion of the tunnel between them.

8. An improved hydrofoil craft as claimed in claim 1 and wherein the keel has a depth to allow the hull to have a very shallow draught whilst the step at the front of the tunnel gives a vertical surface on to which a bracket is attached for the front foil.

9. An improved hydrofoil craft as claimed in claim 3 and wherein the start and finish of each keel is given a gradual curve and the tunnel in cross-section is generally concave and at the rear keels provides two V-sections to the hull cross-section.

10. An improved hydrofoil craft as claimed in claim 1 and wherein at the front, the tunnel is deeper than at the rear.

11. An improved hydrofoil craft as claimed in claim 1 and wherein the three foils are positioned so that the craft normal draught is not affected when the craft is stopped.

12. An improved hydrofoil craft as claimed in claim 3 wherein the leading foil is higher than the bottom of the front keel and is inset the rear foils being located behind the rear ends of the keels.

13. An improved hydrofoil craft as claimed in claim 1 and wherein the leading end of each foil is held in place by a keel bolt whilst its rear end is attached to a bracket in a sheltered position of the respective keel, the foils thus being mounted so as to provide lift directly on to the keels and each foil thus has its side stress plus that of the keel provided for by its sheltered bracket on to the step or transom.

14. An improved hydrofoil craft as claimed in claim 1 and wherein the air valve is one of a large diameter so as to allow a large volume of down draught air, the valve being located with bottom outlet positioned on the craft's longitudinal centre-line and over the rear end of the leading foil so as to provide air flow to the upper surface of such foil and provide an air cushion in the tunnel.

15. An improved hydrofoil craft as claimed in claim 1 and further including provision for varying the pitch of the rear foils.

16. An improved hydrofoil craft as claimed in claim 15 and wherein such provision by each rear foil having a pivot pin coupling at its leading end and a pivot pin coupling for a control rod at its rear upper surface, the rods provided to allow pitch of the rear foils to be altered in 1° steps from 0° to 7°.

17. An improved hydrofoil craft as claimed in claim 15 wherein a mechanical means is incorporated for effecting pitch variation.

18. An improved hydrofoil craft as claimed in claim 1 and further including supplementary foils adjacent the front of the rear keels to increase distribution of the hull weight and stability.

References Cited

UNITED STATES PATENTS

| 1,815,303 | 7/1931 | Kloen | 114—66.5 |
| 2,373,019 | 4/1945 | Dix | 114—66.5 |
| 2,422,818 | 6/1947 | Bamberger | 114—66.5 |
| 3,117,547 | 1/1964 | Cohen et al. | 114—66.5 |
| 3,382,833 | 5/1968 | Wukowitz | 114—66.5 |

ANDREW H. FARRELL, Primary Examiner